United States Patent Office 3,294,572
Patented Dec. 27, 1966

3,294,572
IMPREGNATION OF CARBON WITH SILVER
Salvatore Piccione, Glen Rock, N.J., and John E. Urbanic, Pittsburgh, Pa., assignors to Pittsburgh Activated Carbon Company, Pittsburgh, Pa., a corporation of Pennsylvania
No Drawing. Filed Mar. 8, 1963, Ser. No. 263,738
6 Claims. (Cl. 117—47)

The present invention relates to the impregnation of activated carbon with silver.

It has been proposed to impregnate activated carbon with an aqueous solution of silver nitrate, evaporate the water and heat the product to a high temperature to convert the silver nitrate to metallic silver. This procedure has the disadvantage that the aqueous silver nitrate solution is prematurely reduced by the carbon with the separation of silver crystals with the result that there is not as uniform an impregnation of the activated carbon as desired.

Accordingly, it is an object of the present invention to prepare a more uniform silver impregnated carbon.

Another object is to prevent premature reduction of silver nitrate in contact with activated carbon.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by treating the activated carbon with an acid solution of a silver salt so long as the acid is a solvent for the silver salt and does not form insoluble silver salts.

The activated carbon can be pretreated with the acid or, according to the presently preferred technique, the acid agent is added simultaneously with the silver salt solution.

As illustrative of the acids there can be employed nitric acid, chloric acid, perchloric acid, fluorogallic acid, hydrofluoric acid, lactic acid, fluorosilicic acid, and salicylic acid. There is no need to add large amounts of the acid. Thus, the acid can be as little as 0.5 equivalent per equivalent of silver nitrate. The acid can be used in a larger amount up to 12.0 equivalent per equivalent of silver nitrate.

Any of the conventional activated carbons, pulverized or granular, can be employed. In the specific examples unless otherwise indicated, there was employed Pittsburgh-type carbon SGL which can be made as described in Zabor Patent No. 2,763,580. There can also be used other activated carbons such as Pittsburgh-type CAL, Pittsburgh-type BPL, Columbia activated carbon Grade SXAC, Darco activated carbons, etc.

Generally, from 1 to 156 parts of silver nitrate (dry basis) are used per 100 parts of activated carbon.

The aqueous silver nitrate solution can contain widely varying amounts of silver nitrate, e.g., 5 to 9000 grams per liter of water.

By use of the present invention there have been prepared impregnated activated carbons containing up to 70% of silver based on the weight of the carbon.

Unless otherwise indicated, all parts and percentages are by weight.

The process of the present invention can be carried out at temperatures from room temperature or below to 600° C. The pressure can be atmospheric or a vacuum can be employed. When the treatment of the activated carbon with the acid is carried out at atmospheric pressure and temperatures above 250° C., then nitrogen or other inert gas should be used as the atmosphere to avoid combustion of the carbon.

EXAMPLE 1

80 grams of granular activated carbon 8 x 30 mesh SGL was soaked in a strongly acid solution of silver nitrate. The solution contained 150 cc. of water, 22 grams of silver nitrate and 50 cc. of nitric acid (sp. gr. 1.42). The slurry was warmed up at 70°–80° C. on a hot plate for one hour to evaporate the water until the carbon was just wet. Then it was transferred to a flask and heated at 300° C. under a vacuum of 150 mm. Hg. Then the dry impregnated carbon was heated at 450°–500° C. in a nitrogen atmosphere for 15 minutes to form metallic silver. The heat was shut off and the metallic silver impregnated carbon was allowed to cool to room temperature in a nitrogen atmosphere. The product had 6.5% of silver by weight of the carbon.

EXAMPLE 2

10 grams of pulverized activated carbon SGL was soaked in a solution containing 25 cc. water, 25 cc. nitric acid (sp. gr. 1.42) and 11 grams of silver nitrate. The slurry was heated to 80° C. on a hot plate to evaporate the water until the carbon was first wet. The impregnated carbon was transferred into a flask and heated to 450° C. for 10 minutes in a nitrogen atmosphere. The final product had 70% of silver by weight of the carbon.

EXAMPLE 3

5 grams of granular activated carbon 12 x 40 type CAL was soaked for 1 hour in a solution containing 35 cc. water, 15 cc. nitric acid (sp. gr. 1.42) and 5 grams of silver metaphosphate $AgPO_3$. The wet carbon was thereafter heated at 450°–500° C. in the presence of nitrogen. The product had 15% of silver by weight of the carbon.

EXAMPLE 4

The same experiment was carried out using silver carbonate using the same technique and condition. The product had 30% of silver by weight of the carbon.

EXAMPLE 5

5 grams of granular activated carbon 12 x 40 type CAL were soaked for over 24 hours in a solution of 20 cc. water, 5 cc. hydrofluoric acid (sp. gr. 1.2) and 5 grams silver nitrate. The wet carbon was thereafter heated to 450°–500° C. in the presence of nitrogen. The product had 24% of silver by weight of the carbon. In place of nitrogen there can be used any inert atmosphere, e.g., steam, a mixture of steam and nitrogen, argon or helium.

EXAMPLE 6

The same experiment was carried out using 60% perchloric acid and a product of 20% of silver by weight of the carbon was obtained.

EXAMPLE 7

Acid pretreatment 5 grams of carbon-type SGL 8 x 30 mesh were soaked in 25 cc. nitric acid solution (24%) for 30 minutes. Thereafter the excess solution was drained off and the carbon washed with 10 volumes of distilled water and drained. 20 cc. of silver nitrate solution containing 5 grams silver nitrate were added to the wet carbon. From this point the procedure of impregnating the carbon with silver was the same as in Example 3.

The final product contained 35% of silver by weight of the carbon.

We claim:
1. A method of impregnating activated carbon with silver comprising treating the activated carbon with an acid selected from the group consisting of nitric acid, chloric acid, perchloric acid, fluorogallic acid, hydrofluoric acid, lactic acid, fluorosilicic acid and salicyclic acid and impregnating the activated carbon with an aqueous solution of a silver salt and then converting the silver salt to metallic silver, said acid treatment being at least as early as the addition of the silver salt solution.
2. A process according to claim 1 wherein the activated carbon is impregnated with aqueous silver nitrate.
3. A process according to claim 2 wherein the acid is nitric acid.
4. A process according to claim 1 wherein the activated carbon is treated with an acid prior to impregnation of the carbon with silver nitrate.
5. A process according to claim 1 wherein the activated carbon is treated with an acid simultaneously with the impregnation of the carbon with silver nitrate.
6. A process according to claim 5 wherein the silver nitrate is aqueous silver nitrate and the acid is nitric acid.

References Cited by the Examiner

UNITED STATES PATENTS

| | | | |
|---|---|---|---|
| 1,156,674 | 10/1915 | Ellis | 252—447 |
| 2,692,295 | 10/1954 | Peters | 252—447 |
| 2,773,844 | 12/1956 | Carlson et al. | 252—447 X |

FOREIGN PATENTS

| | | |
|---|---|---|
| 577,862 | 6/1946 | Great Britain. |

RALPH S. KENDALL, *Primary Examiner.*

ALFRED L. LEAVITT, *Examiner.*